United States Patent [19]

Douglas et al.

[11] Patent Number: 4,679,956
[45] Date of Patent: Jul. 14, 1987

[54] QUICK DISCONNECT DEVICE

[75] Inventors: Barry D. Douglas, Palo Alto, Calif.; Frederick A. McCurdy, Royal Oak, Mich.

[73] Assignee: General Motors Corporation, Detroit, Mich.

[21] Appl. No.: 894,553

[22] Filed: Aug. 8, 1986

Related U.S. Application Data

[63] Continuation of Ser. No. 817,280, Jan. 8, 1986, abandoned.

[51] Int. Cl.[4] .......................... B25G 3/00; F16D 1/00
[52] U.S. Cl. ........................................ 403/14; 403/20; 403/322
[58] Field of Search .................. 403/322, 325, 13, 14, 403/20, 328

[56] References Cited

U.S. PATENT DOCUMENTS

| | | | |
|---|---|---|---|
| 3,176,998 | 4/1965 | Parker | 403/20 X |
| 3,693,484 | 9/1972 | Sanderson, Jr. | 403/328 X |
| 4,391,543 | 7/1983 | Elsing | 403/322 X |

OTHER PUBLICATIONS

"Flexible Tooling Update", EOA Systems Incorporated.
EOA Print No. 0108, dated 10-12-84.
"Robotic Peripherals End Effectors, Actuators, Robot Controls and Controllers", Mecanotron Corp.
"Xchange System Overview", Applied Robotics.

*Primary Examiner*—Andrew V. Kundrat
*Attorney, Agent, or Firm*—Edward J. Biskup

[57] ABSTRACT

A coupling device for connecting a work tool to a support that provides a quick disconnect for electrical and fluid connections and is characterized by the use of two separable members which can be locked together through a ball cage and lock ring arrangement.

8 Claims, 4 Drawing Figures

QUICK DISCONNECT DEVICE

This a continuation of application Ser. No. 817,280 filed on Jan. 8, 1986 and now abandoned.

This invention relates to coupling devices and more particularly concerns a quick disconnect device for connecting a work tool to a support and providing a quick disconnect for electrical and fluid connections.

More specifically, the quick disconnect device according to the present invention comprises a first member for rigid connection with a work tool and a second member for rigid connection with a support. A locating pin extends outwardly from the center of the body portion of the second member and an opening is formed in the first member so when the locating pin and the accommodating opening in the first member are axially aligned and are moved towards each other, the locating pin moves into the opening and assures proper coupling of the two members. The opening in the first member is located within a cylindrical base one end of which mounts to the work tool and the other end of which is provided with a projecting cylindrical extension for mating engagement with the free end of the second member. A frusto conical surface is formed on the outer portion of the cylindrical base and a lock ring is formed on the end of the cylindrical extension. The second member comprises a cylindrical housing which includes a sleeve the free end of which carries a ring member formed with a frusto conical surface on the inner diameter thereof that is complementary to the frusto conical surface on the cylindrical base of the first member. A cylindrical ball cage is spaced radially inwardly from the inner cylindrical surface of the sleeve and supports a plurality of balls along the circumference thereof for limited movement in a radial direction out of the ball cage towards the locating pin of the second member. Located within the sleeve of the housing is a body portion which supports the locating pin and has a cylindrical chamber formed therein that is axially aligned with the locating pin. A piston is reciprocably supported in the chamber and has a piston rod that extends out of the chamber for connection with a plurality of axially extending and circumferentially spaced fingers located in the area between the ball cage and the inner cylindrical surface of the sleeve. The free end of the fingers support a cam ring located alongside the balls carried by the ball cage, so upon pressurization of one end of the piston chamber, the cam ring is moved to a first position wherein the associated ball is pressed radially inwardly out of the ball cage towards the locating pin, and upon pressurization of the other end of the piston chamber, the cam ring is moved to a second position wherein the ball is free to float within the ball cage. The arrangement is such that when the first member and the second member are interconnected and the aforesaid one end of the piston chamber is pressurized, the cam ring causes the balls to engage the lock ring of the first member and urge the frusto conical surface on the cylindrical base of the first member into full surface contact with the frusto conical surface of the second member so as to lock the first and second members together.

The objects of the present invention are to provide a new and improved coupling device which includes a pair of connectible members that are adapted to be locked together and are provided with complementary frusto conical surfaces located radially outwardly a distance from the center of the members so that the coupling device can resist increased side loads; to provide a new and improved coupling device which precisely centers and locates a work tool and permits high offset loads in relation to its size; to provide a new and improved coupling device for connecting a work tool to a support that includes a manual lock and unlock feature so no power is required to either lock or release the work tool; to provide a new and improved coupling device which includes a pair of members that employs a locating pin for aligning the members preparatory to locking the members together through a lock ring and a coacting ball cage arrangement; and to provide a new and improved coupling device which includes a pair of members having mating surfaces and that is characterized in that the members lock together when mated through a ball cage and a lock ring arrangement which is conditioned for locking by a plurality of cam members provided with a seven degree self-locking angle that ensures that the members will not be separated.

BRIEF DRAWING DESCRIPTION

Other objects and advantages of the present invention will be apparent from the following description when taken with the drawings in which.

DETAILED DRAWING DESCRIPTION

Figure 1:
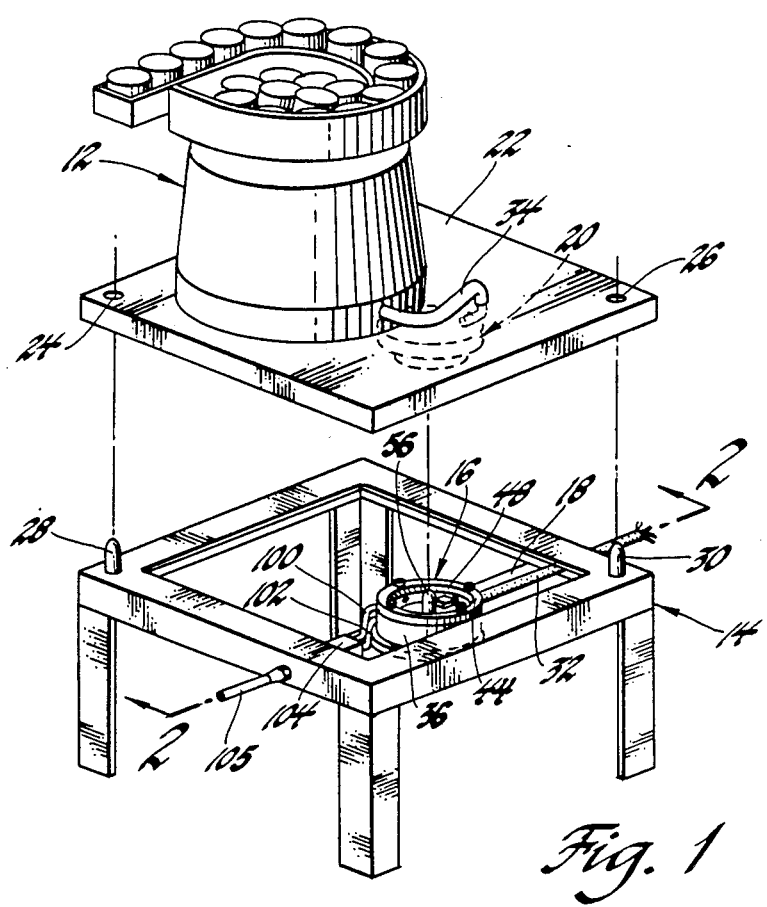
FIG. 1 is a perspective view showing a coupling device made in accordance with the present invention employed with a vibratory parts feeder bowl with one member of the coupling device secured to the feeder bowl and the other secured to a support table.
Figure 3:
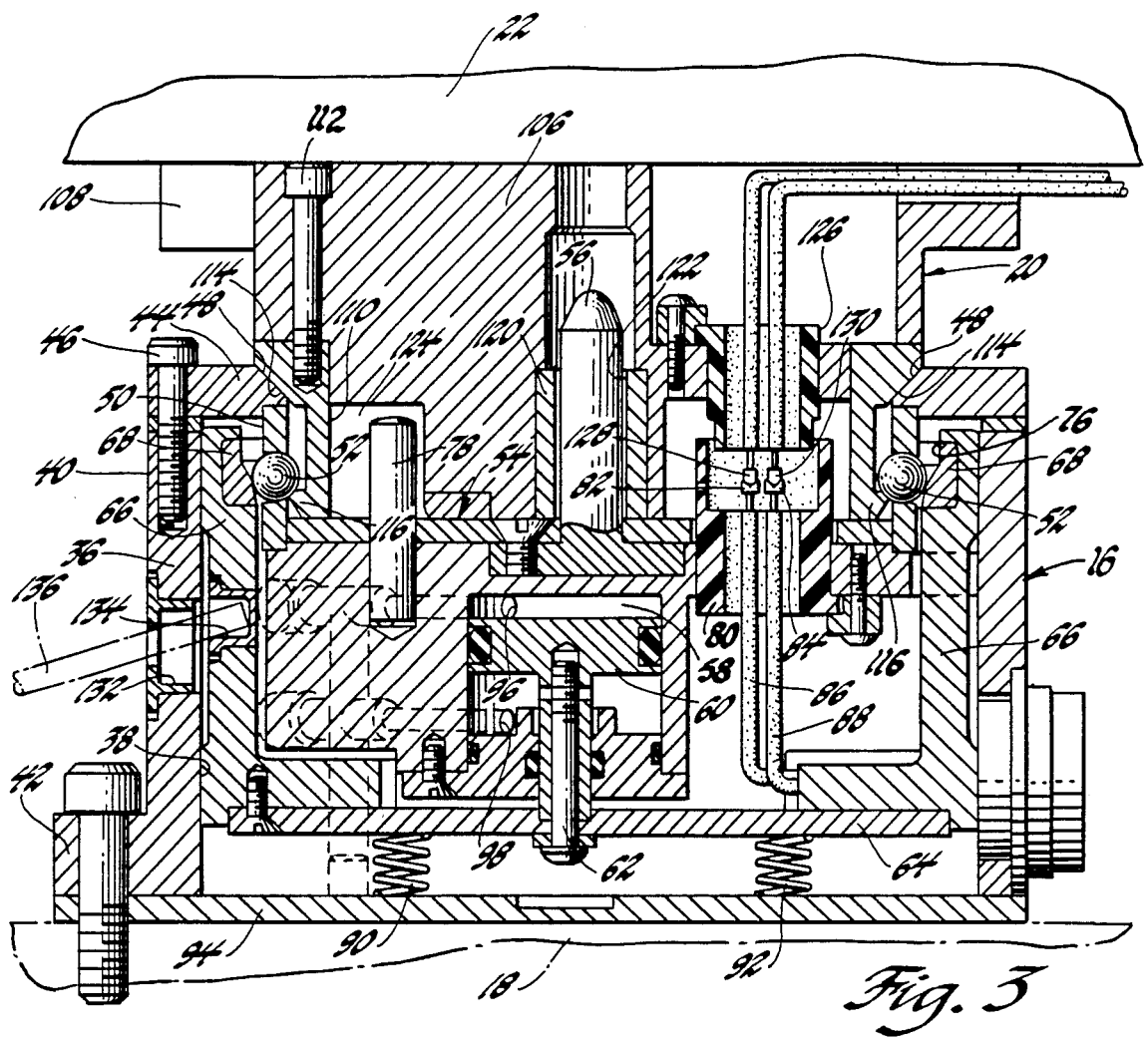
FIG. 3 shows the two members of the coupling device in the combined locked position.

Referring to the drawings and more particularly FIG. 1 thereof, a coupling device made in accordance with the present invention is shown employed with a vibratory parts feeder bowl 12 that is adapted to be mounted on a support table 14. The coupling device consists of a first member 16 secured to a cross bar 18 which forms a part of the frame of the table 14, and a second member 20 that is secured to the underside of a square plate 22 supporting the feeder bowl 12. The plate 22 is provided with a pair of holes 24 and 26 which cooperate with a pair of locating pins 28 and 30 respectively fixed to opposed corners of the table 14 so when the plate 22 is lowered onto the table 14 with the pins 28 and 30 being accommodated by the holes 24 and 26, the two members 16 and 20 of the coupling device automatically mate and lock together as shown in FIG. 3. Once the two members 16 and 20 of the coupling device are joined together as shown in FIG. 3, electrical continuity is established through a pair of electrical cables 32 and 34 so as to provide electrical current for the drive motor (not shown) in the base portion of the feeder bowl 12.

Figure 2:
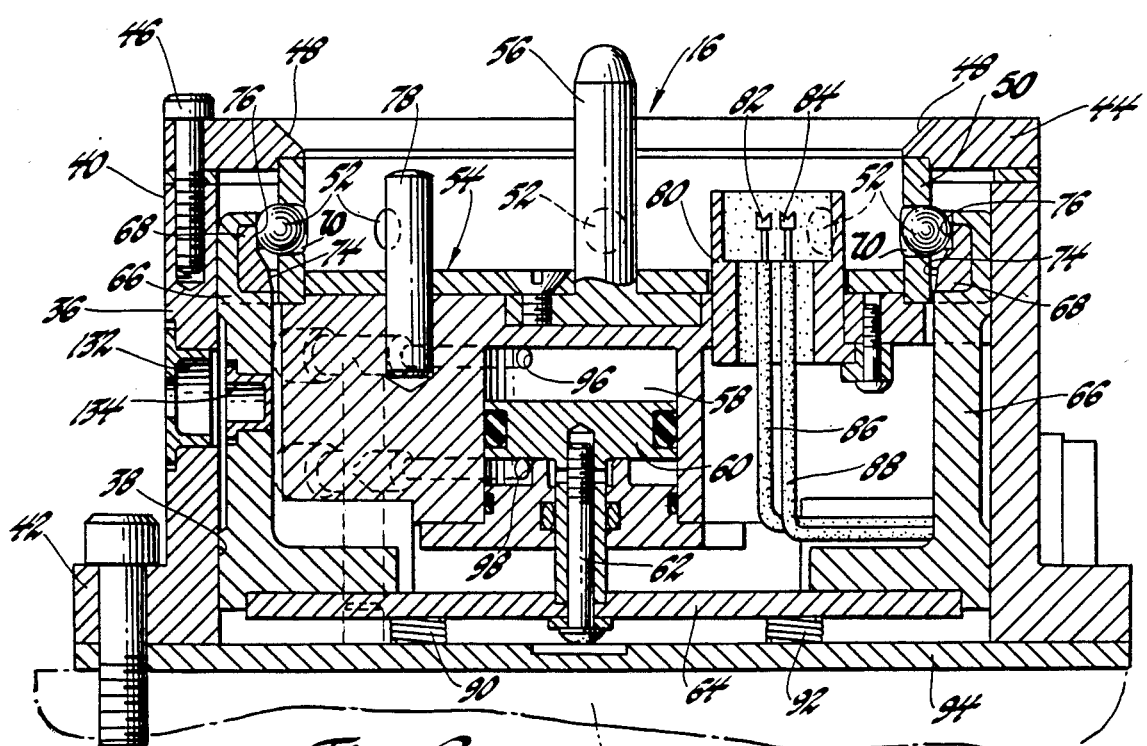
FIG. 2 is an enlarged sectional view of one of the two members of the coupling device taken on line 2—2 of FIG. 1.
Figure 4:
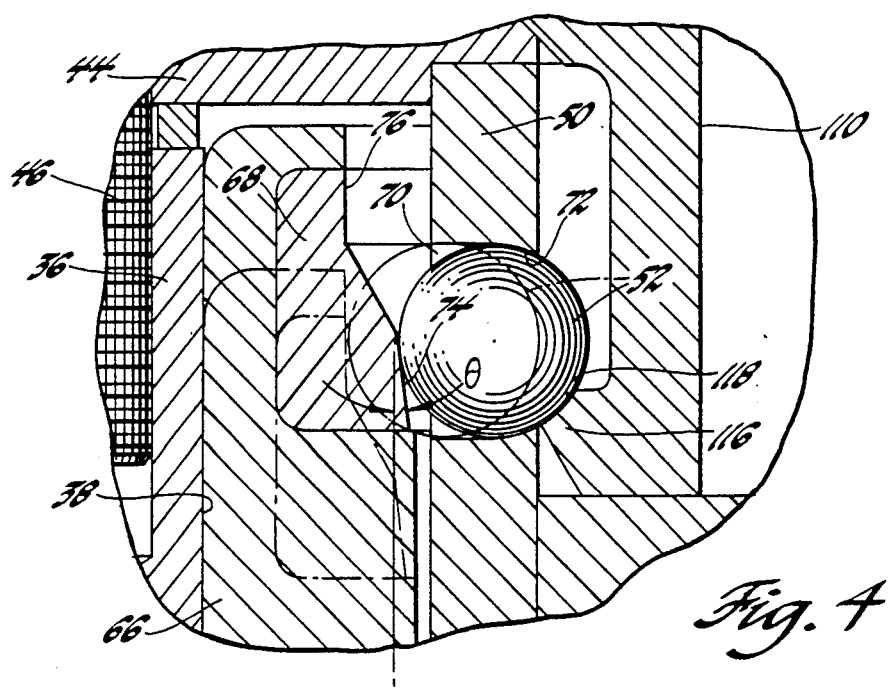
FIG. 4 is an enlarged view showing in detail the cam member which coacts with an associated ball supported in a ball cage for locking together the two members of the coupling device.

More specifically, as seen in FIG. 2, the first member 16 of the coupling device includes a cylindrical housing that includes a base sleeve 36 defined by an inner cylindrical surface 38 and an outer cylindrical surface 40. The lower end of the sleeve 36 has an annular flange 42 bolted to the cross bar 18 of the table 14 while the upper end of the sleeve 36 terminates with a ring member 44 that is secured thereto by a plurality of circumferentially spaced machine screws one of which is indicated by the reference numeral 46. The inner diameter of the ring member 44 is formed with a frusto conical surface 48 which serves as a seating surface in a manner to be described hereinafter. A cylindrical ball cage 50, which supports a plurality of circumferentially spaced balls 52, is located below the seating surface 48 and is rigidly connected between the ring member 44 and a body portion 54 fixed within the cylindrical housing. The center of the body portion 54 rigidly supports an upstanding locating pin 56 below which is a cylindrical chamber 58 that supports a piston head 60 for reciprocable movement between a "release" position shown in FIG. 2 and the "locked" position shown in FIG. 3. A piston rod 62 is connected to the piston head 60 and extends out of the chamber 58 for rigid connection with a radially extending spider member 64. The outer ends of the spider member 64 are secured to the lower ends of a plurality of circumferentially spaced fingers 66 the upper ends of which rigidly support a cam ring 68 that serves to engage the balls 52 carried by the ball cage 50. In this regard it will be noted that the ball cage 50 is provided with eight balls 52 each of which freely float within an accommodating opening 70 within the ball cage 50. The balls 52 are circumferentially equally spaced about the ball cage 50 and, as shown in FIG. 4, are movable radially inwardly towards the locating pin 56 between the shown phantom line position and the full line position. The radial inward movement of each ball 52 is limited by the configuration of each opening which, at its inner end, is formed with a spherical curved surface 72 so the ball 52 is prevented from dropping out of the ball cage 50 and also prevented from extending radially inwardly beyond the full line position seen in FIG. 4. The cam ring 68 also has two positions one being the full line position of FIG. 4 so as to cause a cam surface 74 formed on the cam ring 68 to urge each ball 52 to the full line position while the other position of the cam ring is shown in phantom lines wherein the ball 52 moves to the phantom line position and is prevented from dropping out of the accommodating opening 70 by the upper surface 76 of the cam ring 68 as seen in FIG. 2.

The body portion 54 of the member 16 also rigidly supports an upstanding dowel 78 which is located between the ball cage 50 and the locating pin 56. Diametrically opposite the dowel 78, the body portion 54 is provided with an electrical connector 80 which in this case includes a pair of upstanding contacts 82 and 84 respectively connected to a pair of conductors 86 and 88 which extend through the cable 32 and serve to carry electrical current. It will also be noted that the spider member 64, and accordingly the fingers 66 and the cam ring 68, is continuously biased upwardly by a pair of coil springs 90 and 92 located between the spider member 64 and a disc plate 94 which closes the lower end of the cylindrical housing. In addition, a pair of ports 96 and 98 are provided in the side wall of the chamber 58; the port 96 being located at the upper end of the chamber 58 while the other port 98 is located at the lower end of the chamber 58. The ports 96 and 98 are connected to a pair of air hoses 100 and 102 respectively, as seen in FIG. 1, which in turn are connected to a two-way valve 104 which receives pressurized air via a conduit 105. Thus, when the lever (not shown) of the valve 104 is located in one position, the upper port 96 is connected to the pressurized air while the lower port 98 is connected to atmosphere so as to pressurize the upper end of the piston head 60 causing the latter to assume the "release" position shown in FIG. 2. When the lever of the valve 104 is located in a second position, the lower port 98 is connected with the pressurized air and the port 96 is connected to atmosphere. As a result, the piston head 60 and accordingly the cam ring 68, is moved to the upper or "locked" position shown in FIG. 3 to lock the second member 20 to the first member 16 as will be more fully described hereinafter.

In this regard, it will be noted that the second member 20 of the coupling device, as seen in FIG. 3, includes a cylindrical base portion 106 integrally formed with a flange 108 rigidly fixed to the plate 22. The free end of the base portion 106 is provided with a cylindrical ring type extension 110 that projects downwardly therefrom. The extension 110 is secured to the base portion 106 by a plurality of circumferentially spaced machine screws one of which is shown in FIG. 3 and identified by the reference numeral 112. The upper outer end of the extension 110 has a frusto conical surface 114 formed thereabout that is complementary to and adapted to mate with the seating surface 48 of the member 16. The lower end of the extension 110 has a radially outwardly extending annular lip 116 which, as seen in FIG. 4, is formed with an angled surface 118 and serves as a lock ring against which the balls 52 carried by the ball cage 50 are movable for locking the two members 16 and 20 together. The center of the base portion 106 rigidly supports a cylindrical sleeve 120 having an opening 122 which accommodates the locating pin 56 attached to the body portion 54 of the member 16 with a twenty thousands clearance between the pin 56 and opening 122. Spaced laterally from the sleeve 120 to one side thereof is a slot 124 formed in the base portion 106 which is adapted to receive the dowel 78 so as to angularly align the two members 16 and 20 and assure that a connector 126 located on the opposite side of the sleeve 120 is properly positioned relative to the connector 80 of the member 16 and thereby causes the contacts 128 and 130 to engage the contacts 82 and 84 so as to provide electrical current via cable 34 to the drive motor associated with the feeder bowl 12.

From the above description it should be apparent that prior to the feeder bowl 12 being lowered onto the table 14 so as to provide an electrical connection to the drive motor of the feeder bowl through the coupling device, the lever of the valve 104 is positioned so as to supply pressurized air through the port 96 to the upper part of the chamber 58. This causes the piston head 60 to be moved to the position shown in FIG. 2, which, in turn, causes the cam ring 68 to be positioned so that the balls 52 are free to move radially outwardly towards the cam ring 68. As the feeder bowl 12 is lowered onto the table 14 with the holes 24 and 26 registering with the locating pins 28 and 30, the locating pin 56 will move into and be accommodated by the sleeve 120 of the member 20. At the same time, the dowel 78 will be located in the slot 124 formed in the base portion 106 so that the two connectors 80 and 126 cause the contacts 82, 84, and 128, 130 to engage each other as seen in FIG. 3. When the plate 22 is resting on the table 14, the two members 16 and 20 will assume the relative position seen in FIG. 3 at which time the frusto conical seating surfaces 48 and 114 will be in surface to surface contact. The lever of valve 104 will then be moved to the "locked" position causing pressurized air to flow through the port 98 into the chamber 58 so as to raise the piston head 60 and accordingly the cam ring 68 to the position shown in FIG. 3. This then causes the annular surface 74 formed on the cam ring 68 to urge all of the balls 52 radially inwardly into contact with the surface 118 of lip 116 causing a downward force to be applied further assuring firm seating engagement between the surfaces 48 and 114. As the balls 52 are cammed radially inwardly, all of the balls 52 shift to equally carry the load and precisely locate the two members 16 and 20. It will be noted that as seen in FIG. 4, the angle Theta ($\theta$), which defines the position of the cam surface 74 relative to the vertical, is preferably seven degrees (7°) so as to provide a self-locking ramp continually being driven against the balls 52. This also takes up any lash between the two members 16 and 20 due to wear so as to insure an extremely rigid and tight fit over the life of the coupling device. In addition, inasmuch as the seating surfaces 48 and 114 are located on a circle whose diameter is substantially equal to the outer diameter of the member 20, firm engagement is provided between the members 16 and 20 so that any offset forces generated by the feeder bowl 12 during vibratory movement thereof that could decouple the members is resisted.

Finally, it will be noted that, as seen in FIG. 2, the member 16 is provided with a circular opening 132 in the sleeve 36 and a circular cavity 134 is formed in one of the fingers 66. Thus, a short rod 136 can be inserted into the cavity 134, as shown in FIG. 3, and when the free end of the rod 136 is raised, the cam ring 68 can be lowered against the bias of the springs 90 and 92 so as to provide a manual unlock feature that can be used to release the coupling device in the event that there is a failure of the pressurized air. It will also be noted that although the coupling device described above provides a connection for electrical cables, it can also be used for providing a connection for a pair of conduits carrying a fluid such as compressed air or hydraulic oil.

Various changes and modifications can be made in the construction of this coupling device without departing from the spirit of the invention. Such changes and modifications are contemplated by the inventors, and they do not wish to be limited except by the scope of the appended claims.

The embodiments of the invention in which an exclusive property or privilege is claimed are defined as follows:

1. A coupling device connecting a work tool to a support and providing a quick disconnect for electrical and fluid connections, said coupling device comprising a first member for rigid connection with said work tool and a second member for rigid connection with said support, a locating pin extending axially from said second member, an opening formed in said first member so when said first and said second members are axially aligned and moved towards each other said locating pin moves into said opening, said first member including a cylindrical base provided with a projecting cylindrical extension, a frusto conical surface formed on the outer surface of said cylindrical base and a locked ring formed on the end of said cylindrical extension, said second member comprising a cylindrical housing which includes a sleeve, a ring member located at the free end of said sleeve and having a frusto conical surface formed on the inner diameter of said ring member that is complementary to said frusto conical surface on said cylindrical base, a cylindrical ball cage spaced radially inwardly from said sleeve and supporting a plurality of balls along the circumference thereof for limited movement in a radial direction out of said ball cage towards said locating pin, said housing having a body portion formed with a cylindrical chamber, a piston located in said chamber, a cam ring located alongside said plurality of balls, means connecting said piston to said cam ring, a cam surface formed on said cam ring so when said piston is in a first position said plurality of balls are pressed by said cam surface radially inwardly out of said ball cage towards the longitudinal center axis of said housing and when said piston is in a second position said plurality of balls are free to float within said ball cage, the arrangement being such that when said first member and said second member are interconnected said one end of said chamber is pressurized to cause said piston to be located in said first position to cause said plurality of balls to engage said lock ring of said first member and urge said frusto conical surface on said cylindrical base of said first member into full surface contact with said frusto conical surface on said ring member of said second member and simultaneously lock said first and second members together, and when the other end of said chamber is pressurized said piston is located in said second position and said first and second members can be separated.

2. A coupling device connecting a work tool to a support and providing a quick disconnect for electrical and fluid connections, said coupling device comprising a first member for rigid connection with said work tool and a second member for rigid connection with said support, a locating pin extending axially from said second member, an opening formed in said first member so when said first and said second members are axially aligned and moved towards each other said locating pin moves into said opening, said first member including a cylindrical base provided with a projecting cylindrical extension, a frusto conical surface formed on the outer surface of said cylindrical base and a lock ring formed on the end of said cylindrical extension, said second member comprising a cylindrical housing which includes a sleeve, a ring member located at the free end of said sleeve and having a frusto conical surface formed on the inner diameter of said ring member that is complementary to said frusto conical surface on said cylindrical base, a cylindrical ball cage spaced radially inwardly from said sleeve and supporting a plurality of balls along the circumference thereof for limited movement in a radial direction out of said ball cage towards said locating pin, said housing having a body portion formed with a cylindrical chamber, a piston located in said chamber, a piston rod having one end thereof extending into said chamber for connection with said piston, the other end of said piston rod extending out of said chamber, a plurality of axially extending fingers located in the area between said ball cage and said sleeve, each of said fingers supporting a cam ring located alongside said plurality of balls and being formed with a cam surface so when said each of said fingers is in a first position said plurality of balls are pressed by said cam surface radially inwardly out of said ball cage towards the longitudinal center axis of said housing and when said fingers are in a second position said plurality of balls are free to float within said ball cage, means connecting said other end of said piston rod to said plurality of fingers so that upon pressurization of one end of said piston said fingers are moved to said first position and upon pressurization of the other end of said piston said fingers are moved to said second position, the arrangement being such that when said first member and said second member are interconnected said fingers are located in said first position to cause said plurality of balls to engage said lock ring of said first member and urge said frusto conical surface on said cylindrical base of said first member into full surface contact with said frusto conical surface on said ring member of said second member and simultaneously lock said first and second members together.

3. A coupling device connecting a work tool to a support and providing a quick disconnect for electrical and fluid connections, said coupling device comprising a first member for rigid connection with said work tool and a second member for rigid connection with said support, a locating pin extending axially from said second member, an opening formed in said first member so when said first and said second members are axially aligned and moved towards each other said locating pin moves into said opening, said first member including a cylindrical base provided with a projecting cylindrical extension, a frusto conical surface formed on the outer surface of said cylindrical base and a lock ring having a radially outwardly extending lip formed on the end of said cylindrical extension, said second member including a cylindrical housing having a sleeve defined by an outer cylindrical surface and an inner cylindrical surface, a ring member secured to the free end of said sleeve and having a frusto conical surface formed on the inner diameter of said ring member that is complementary to said frusto conical surface on said cylindrical base, a cylindrical ball cage spaced radially inwardly from said inner cylindrical surface of said sleeve and secured to said ring member and supporting a plurality of balls along the circumference thereof for limited movement in a radial direction out of said ball cage towards said locating pin, said housing having a body portion formed with a cylindrical chamber which is in axial alignment with said locating pin, a piston located in said chamber, a piston rod having one end thereof extending into said chamber for connection with said piston, the other end of said piston rod extending out of said chamber, a plurality of axially extending fingers located in the area between said ball cage and said inner cylindrical surface of said sleeve, each of said fingers supporting a cam ring located alongside said plurality of balls and being formed with a cam surface so when said each of said fingers is in a first position said plurality of balls are pressed by said cam surface radially inwardly out of said ball cage towards the longitudinal center axis of said housing and when said fingers are in a second position said plurality of balls are free to float within said ball cage, a spider member connecting said other end of said piston rod to said plurality of fingers so that upon pressurization of one end of said piston said fingers are moved to said first position and upon pressurization of the other end of said piston said fingers are moved to said second position, the arrangement being such that when said first member and said second member are interconnected said fingers are located in said first position to cause said plurality of balls to engage said lip of said lock ring of said first member and urge said frusto conical surface on said cylindrical base of said first member into full surface contact with said frusto conical surface on said ring member of said second member and simultaneously lock said first and second members together.

4. The coupling device of claim 3 wherein said cam surface has a seven degree (7°) ramp angle.

5. The coupling device of claim 4 wherein spring means are provided for continuously urging said fingers to said first position.

6. The coupling device of claim 5 wherein said sleeve is formed with an opening that registers with a cavity in one of said fingers so as to allow a tool to be inserted through said opening into said cavity for manually moving said fingers from said first position to said second position when the operating fluid for moving said piston is not available.

7. The coupling device of claim 5 wherein said spring means engages said spider member.

8. The coupling device of claim 6 wherein a dowel is located between said ball cage and said locating pin for positioning said first member relative to the second member to ensure proper engagement between said electrical and fluid connections.

* * * * *